United States Patent [19]

Ushijima

[11] 3,875,654

[45] Apr. 8, 1975

[54] METHOD OF MANUFACTURING AN OIL SEAL

[75] Inventor: Masahiko Ushijima, Fujisawa-shi, Kanagawa-ken, Japan

[73] Assignee: Nippon Oil Seal Industry Co., Ltd., Tokyo, Japan

[22] Filed: Oct. 26, 1973

[21] Appl. No.: 409,943

Related U.S. Application Data

[62] Division of Ser. No. 286,338, Sept. 5, 1972, abandoned.

[30] Foreign Application Priority Data

Sept. 4, 1971  Japan.............................. 46-68260

[52] U.S. Cl. ........ 29/527.1; 425/DIG. 47; 264/260; 264/266; 264/268; 277/153
[51] Int. Cl...................... B29d 3/00; B29c 27/22
[58] Field of Search.................. 425/DIG. 47, 395; 29/527.1, 472.9, 475; 264/266, 268, 276, 260; 277/152, 153

[56] References Cited
UNITED STATES PATENTS

| 3,090,996 | 5/1963 | Reichenbach et al. ............. 29/527.1 |
| 3,276,115 | 10/1966 | Hansz ................................ 29/527.1 |
| 3,440,122 | 4/1969 | McCormick ..................... 277/153 X |
| 3,490,139 | 1/1970 | McKinven.......................... 29/527.1 |
| 3,614,183 | 10/1971 | Berens et al. ..................... 277/153 X |
| 3,619,458 | 11/1971 | Engelhardt.......................... 264/260 |

FOREIGN PATENTS OR APPLICATIONS

| 692,717 | 6/1953 | United Kingdom................ 277/153 |
| 815,284 | 10/1951 | Germany ............................. 277/153 |

Primary Examiner—Al Lawrence Smith
Assistant Examiner—K. J. Ramsey
Attorney, Agent, or Firm—Holman & Stern

[57] ABSTRACT

An oil seal comprising a metal ring having an axially extending portion and a radial portion, with the radial portion including a bent portion near its free edge. Resilient sealing material is bonded to the axially extending portion to form a static seal portion and to the free edge of the radial portion to form a dynamic seal portion, the two seal portions being separated by exposed annular opposite side surfaces of the metal ring between the axially extending portion and the bent portion thereof. The dynamic seal portion has a plurality of circumferentially and uniformly spaced small apertures formed therein. The oil seal is formed by a process which concurrently effects bonding of the resilient sealing material to the metal ring and formation of the bent portion therein.

1 Claim, 9 Drawing Figures

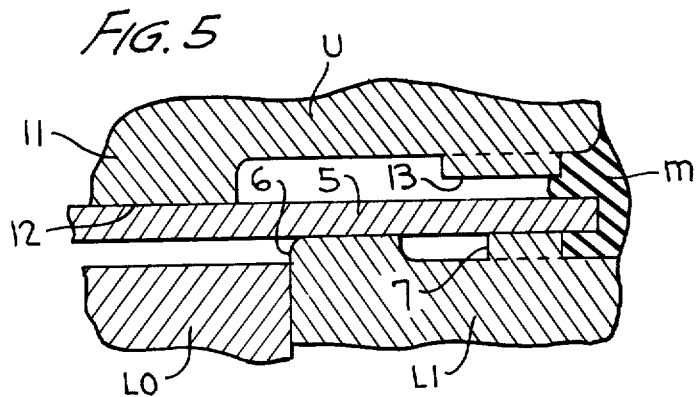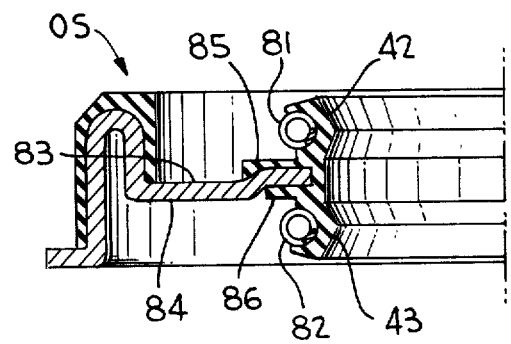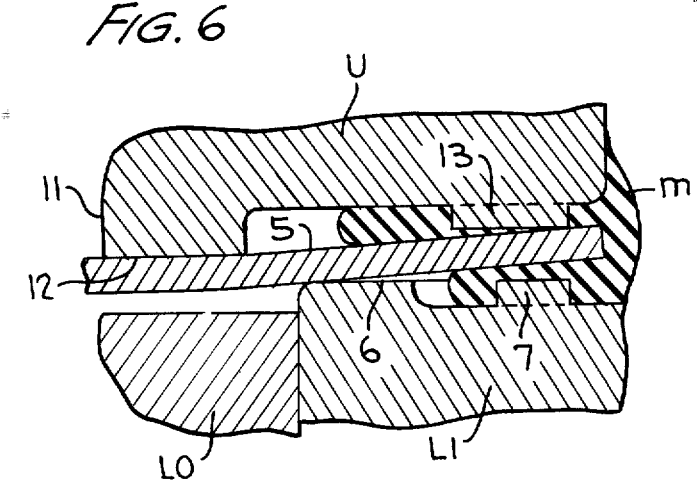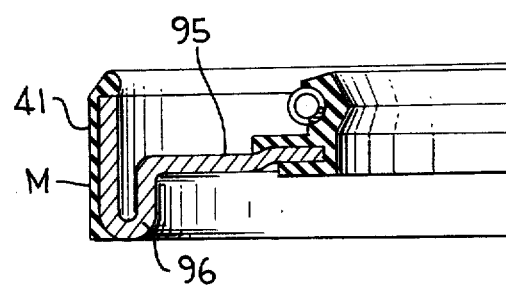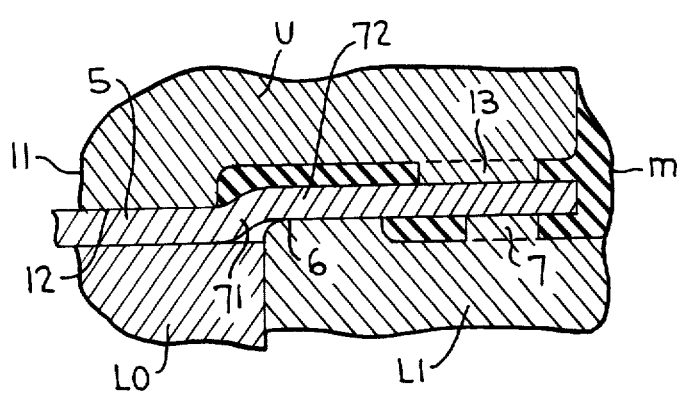

METHOD OF MANUFACTURING AN OIL SEAL

This is a division of application Ser. No. 286,338, filed Sept. 5, 1972, now abandoned.

This invention relates to oil seals and a method of manufacturing the same.

In the prior-art oil seal of the type where a sealing lip portion, i.e., a dynamic seal portion (usually for frictional engagement with a rotary shaft) is formed on one peripheral edge of a metal reinforcing ring and a resilient engagement portion, i.e., a static seal portion (usually for insertion in a housing bore) is formed on the other peripheral edge, the material of the dynamic and static seal portions bonded through vulcanization to the reinforcing ring is continuous from one to the other. In other words, either or both sides of the reinforcing ring are entirely covered with the resilient material.

In cases where the sealed process fluid is corrosive in nature, it is highly desirable to completely cover the reinforcing ring with the resilient material so as to prevent direct contact of the ring with the fluid. However, where the sealed fluid is oil, water or muddy matter as is most frequently encountered, the use of such large amounts of the resilient material, which may be expensive in some cases, is unnecessary and, particularly in the case of oil seals of larger sizes, may substantially increase the cost of manufacturing the seal.

Accordingly, an object of the invention is to provide an oil seal which is improved in the aspect of economy and the method of manufacturing the same.

Another object of the invention is to provide an oil seal, which can use different materials for the dynamic and static seal portions, and the method of manufacturing the same.

A further object of the invention is to provide an oil seal, which uses a minimum amount of resilient material for the dynamic seal portion and nevertheless ensures strong bonding, and the method of manufacturing the same.

The invention will now be described in connection with the accompanying drawings, in which:

FIG. 5 is a sectional view showing, to an enlarged scale, part of FIG. 2;

FIG. 6 is a sectional view showing, to an enlarged scale, part of FIG. 3;

FIG. 7 is a sectional view showing, to an enlarged scale, part of FIG. 4;

FIG. 8 is a sectional view showing an oil seal manufactured by the method illustrated in FIGS. 1 to 4; and FIG. 9 is a sectional view showing another oil seal embodying the invention.

Figure 1:
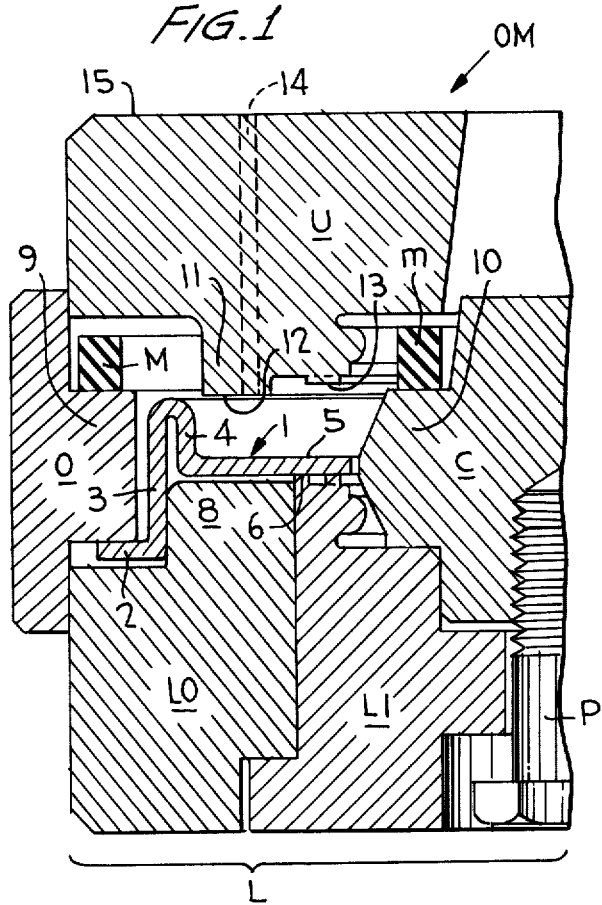
FIGS. 1 to 4 are sectional views of a forming press illustrating the respective steps of the method of forming the oil seal embodying the present invention.

Referring now more particularly to the drawings, in FIG. 1, there is shown a forming press OM, which comprises an upper die U, an outer die O, a core die C and a lower die L. The lower die L consists of outer and inner lower die sections LO and LI assembled together. A pin P is inserted through an opening in the inner lower die section LI into the core die C.

Numeral 1 designates an oil seal reinforcing ring, which is formed by stamping. It consists of an outer radial flange portion 2, a large diameter axial portion 3, a small diameter axial portion 4 and an inner radial flange portion 5. It is placed on the lower die such that its radial portion 5 is supported near the free edge thereof on an annular projection 6 formed on the inner lower die section LI and also on circumferentially and uniformly spaced projections 7 also formed thereon the inner side of the annular projection and that the inner surface of the large diameter axial portion 3 extending at right angles to the radial portion 5 engages a reduced diameter portion 8 of the outer lower die section LO. Thus, the radial portion 5 is held at right angles to the axis of the forming press OM.

The outer die O is provided with an inner annular shelf portion 9, on which is placed a ring body M made of a resilient material such as synthetic rubber. The core die C is formed with an outer annular shelf portion 10, whose top is flush with the shelf 9, and on which is similarly placed a ring body m made of a resilient material such as synthetic rubber.

The upper die U is provided with a lower annular projection 11 having a considerably wide, flat lower face 12. It is also provided with circumferentially and uniformly spaced lower projections 13 on the inner side of the annular projection 11 and located radially inwardly of the annular projection 6 of the inner lower die section LI. The upper die U is also formed with an air passage hole 14 extending from the lower face 12 up to the upper face 15 to communicate the space defined by the upper die U, outer die O, lower die L and core die C with the outside.

Figure 2:
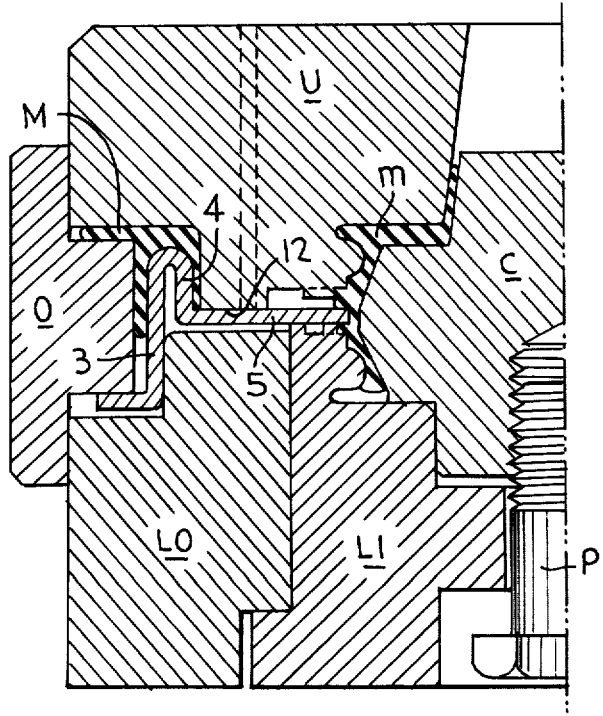

In FIG. 2, the upper die U is shown to be lowered to a position, at which the lower face 12 is just brought into contact with the radial portion 5 of the reinforcing ring 1. At the time, the material M has migrated to reach the large diameter axial portion 3, small diameter axial portion 4 and a U-shaped portion therebetween, while the material m has migrated to reach the free edge portion of the radial portion 5. The radial portion 5, at this instant, still remains flat.

Figure 3:
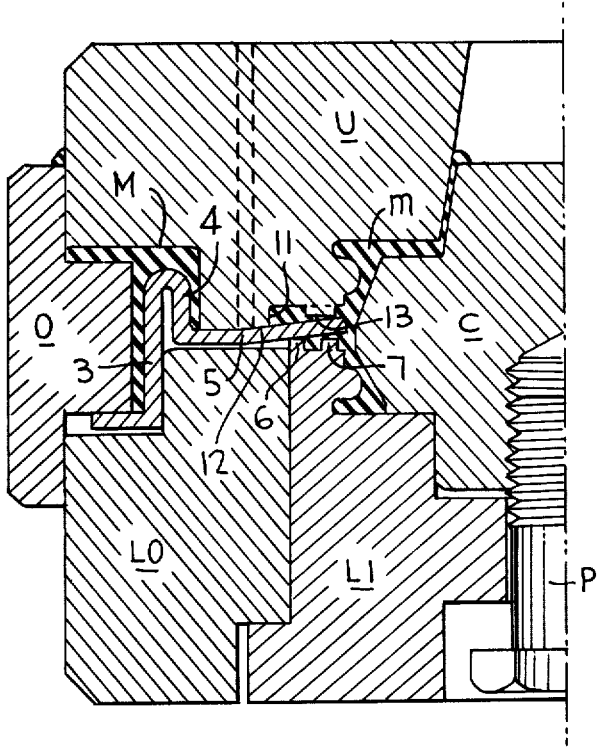

In FIG. 3, the material M is shown to have completely filled its formation space. It is bonded to the entire outer surface of the large diameter and small diameter axial portions 3 and 4. Meanwhile, the material m is shown to have migrated along the upper surface of the radial portion 5 through gaps between equally spaced projections 13 until it is stopped by the annular projection 11 and also along the lower surface of the radial portion 5 through the gaps between equally spaced projections 7 until it is stopped by the annular projection 6. Thus, it is completely filling its formation space. At this time, the free edge portion of the radial portion 5 is upwardly bent, and it is in contact with the uniformly spaced projections 13 of the upper die. This has resulted from part of the radial portion 5 adjacent the small diameter axial portion 4 having been pushed by the lower face 12. Since at this time the descending of the upper die U is not yet ended, the material M and m partly remain in the space between upper die U and outer die O and in the space between upper die U and core die C.

Figure 4:
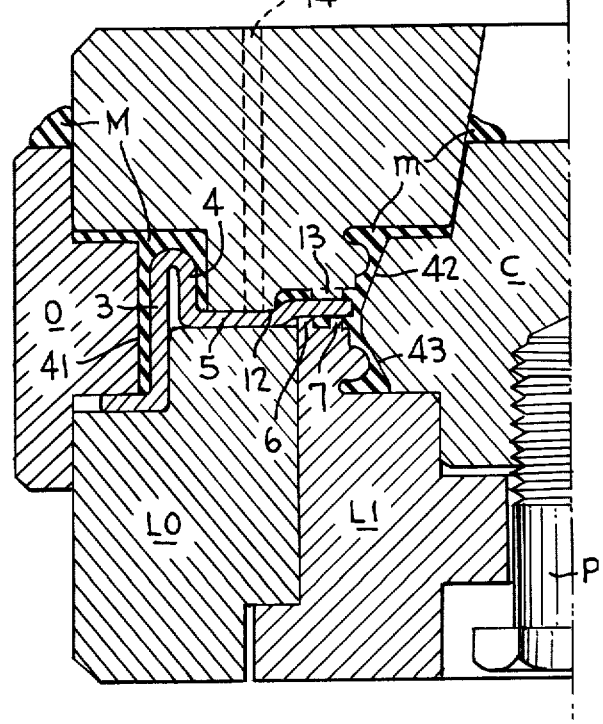

In FIG. 4, the upper die U is shown to have completed its descending. At this time, the outer die O holds the radial flange portion 2 of the reinforcing ring 1 completely urged against the outer lower die section LO, so that migration of the material M through this part does not take place. Also, the lower face 12 of the upper die U holds part of the radial portion 5 adjacent the small diameter axial portion 4 completely urged against the top of the outer lower die section LO, so that this part is flat and none of the materials M and m has migrated to reach this part. An inner part of the radial portion 5 is deformed into a slanted form due to the presence of the annular projection 6 of the inner lower die section LI, and it terminates in a flat edge part clamped between the uniformly spaced projections 13 of the upper die on the inner side of the annular projection 6 and the uniformly spaced projections 7 of the inner lower die section LI. Since air escapes through the air passage hold 14, no bubbles are formed within the materials M and *m*, so that these materials can completely fill their respective formation spaces. The material M., which has thus been bonded to the large diameter and small diameter axial portions 3 and 4 of the reinforcing ring 1, serves as static seal material and constitutes an engagement portion 41 fitted in a housing bore. The material *m*, which has been bonded to the inner edge portion of the radial portion 5, constitutes a dynamic seal portion having two sealing lips 42 and 43.

The stages of bending of part of the radial portion 5 near the inner edge thereof and the manner of bonding of the material m at the instants of FIGS. 2, 3 and 4 are shown in detail in FIGS. 5, 6 and 7 respectively. The radial portion 5, which was completely flat in the stage of FIG. 5, is formed with a slanted portion 71 terminating in a flat inner edge portion 72 in the final vulcanization stage of FIG. 7.

It will be seen from these Figures that the material M and *m* are used only in minimum required amounts. Also, the inner side material *m* may not only be bonded to the bent inner edge of the reinforcing ring 1, but it may be bonded over a considerably wide radial portion, so that strong bonding may be obtained. Besides, the bonding can be effected while concurrently forming the bent portion, which is advantageous in view of the formation of the reinforcing ring 1. Furthermore, the materials M and *m* may be different. For example, the material M may be comparatively inexpensive nitrile rubber, while the material m may be more expensive silicone rubber or fluorine rubber. The selection of the material shall be done by taking pressure, peripheral speed, process fluid and other sealing conditions into consideration.

FIG. 8 shows an oil seal OS, which is obtained by mounting springs 81 and 82 in the seal lips 42 and 43 of the eventual seal taken out of the forming press after the step of FIG. 4. It has upper and lower exposed reinforcing ring surfaces 83 and 84 in the radial portion thereof and also circumferentially and uniformly spaced recesses 85 and 86 formed by the projections 13 and 7 of the upper and lower dies.

FIG. 9 shows another oil seal, which is also manufactured by the method according to the invention. In this seal, the U-shaped portion 96 between the large and small diameter axial portions of the oil seal reinforcing ring 95 is directed oppositely to the embodiment of FIG. 8. Also, the outer side material M is bonded only to the outer periphery of the large diameter axial portion. The oil seal of this Figure may be manufactured by placing the reinforcing ring such that the outer periphery of the lower projection 11 of the upper die U engages the inner periphery of the large diameter axial portion instead of the embodiment of FIGS. 1 to 4.

While the preceding embodiment has been concerned with the lowering of the upper die U and formation of the lips along the inner edge of the reinforcing ring by means of the vulcanization bonding of the material, according to the invention it is of course possible to use a rising lower die, and the invention may also be applied to the outer seal having outer peripheral lips.

What is claimed is:

1. A method of manufacturing an oil seal, which comprises supporting between an upper die and a lower die of a forming press a metal ring, a first portion of resilient material and a second portion of resilient material, said upper die having an annular lower projection, said lower die having an annular upper projection, said metal ring having an axially extending portion and a radial portion extending substantially at right angles to said axially extending portion and being supported near its free edge on said upper projection of said lower die, said first portion of resilient material being supported adjacent said axially extending portion of said ring and said second portion of resilient material being supported adjacent said radial portion of said ring, and moving said upper die and said lower die relatively toward each other so as to cause said first and second portions of resilient material to migrate toward and become bonded respectively to said axially extending portion and said radial portion of said ring thereby forming respective static and dynamic seal portions defining between them annular exposed surfaces on opposite sides of said radial portion of said ring, said relative movement of said upper and lower dies also causing said lower projection of said upper die and said upper projection of said lower die to cooperatively act upon said radial portion of said ring so as to form a bent portion near the free edge of said radial portion.

* * * * *